Jan. 13, 1959 R. L. HOISINGTON 2,868,473

TAPE REELING APPARATUS

Filed Oct. 29, 1954

INVENTOR.
RICHARD L. HOISINGTON

BY Ralzemond B. Parker

ATTORNEY

United States Patent Office 2,868,473

Patented Jan. 13, 1959

2,868,473

TAPE REELING APPARATUS

Richard L. Hoisington, Collegeville, Pa., assignor to Burroughs Corporation, Detroit, Mich., a corporation of Michigan Application October 29, 1954, Serial No. 465,701

7 Claims. (Cl. 242—72)

This invention relates to reeling devices and more particularly to an improved winding hub or spool for use with reeling apparatus.

In the art of reeling apparatus, and especially the reeling mechanisms developed for use with apparatus of different manufacturers, it is often a considerable problem to transfer a coiled or wound web of material from one machine to another and different machine unless the reel assembly of the first machine is physically interchangeable with that of the second machine. If the physical geometry of the two reel assemblies is substantially different obviously no transfer of reels can be made. Under these circumstances, if the web of material is to be utilized with the second machine it becomes necessary to remove the coiled web from the first reel and wind the web onto the reel of the second machine. It is apparent that this procedure is not only inefficient and tedious, but time consuming as well. Unless the coiled web is handled delicately and carefully during this transfer operation the turns of material are apt to spring apart and rapidly unwind. Even with careful handling the turns are liable to become misaligned or entangled one with another causing delay in handling and subjecting the coiled material to unnatural stresses which lead to breakage. Another problem is that of overloading the reel assembly by exceeding the capacity of either of the reels since it is not always possible to make a visual check of the amount and condition of the web as it is being reeled.

An important object of the present invention therefore is to provide a novel insertion and removal means for mounting and securing a web or tape against accidental dislodgement or uncoiling.

Another important object of the invention is to provide a novel demountable tape reel.

Another important object of the invention is to provide a novel reel having resilient deformable supporting and securing means.

A still further object of the invention is to provide a visible easily accessible means for checking the condition of the material being reeled.

A further object of the invention is to provide a novel mounting means for a tape reel which when properly assembled as a unit forms a relatively rigid spool or hub on which the tape may be wound but which when disassembled is resistingly compressible toward the spool hub axis to afford ready removal of the tape.

In accordance with the present invention there is provided reeling apparatus for realizing the above objects. The reel is comprised of two discs which are adapted to be spaced a slight distance apart depending on the width of the material which is to be wound therebetween. One of the discs may be transparent so as to provide a visible check on the material supply as it is being reeled. Spacing elements are mounted concentrically about the axis of each one of the discs to provide means for maintaining the discs in spaced apart relation. The spacing elements serve additionally as supports about which a web of material may be wound and are therefor adapted to be rigid when the two discs are in an assembled state. However, one of the discs is detachably secured to the other and when the two discs are in a disassembled state the spacing elements are laterally displaceable toward the axis of the disc upon which the web of material is placed. The web of material may thus be fully withdrawn from the reel by manual displacement of these spacing elements.

In one embodiment of the reeling apparatus the spacing elements may comprise a series of studs mounted on one disc which are adapted to be telescopically received within a mating series of helically coiled springs secured to the other disc when the two discs are in an assembled condition. The terminal or end portion of each of the coil springs may be straightened and bent back upon itself so as to extend parallel to the spring axis and press tightly against the coils of the spring thus forming a gripping area into which the leading edge of a web of material may be introduced and yieldingly fastened. Telescoping the studs of one disc within the springs of the other disc stiffens the springs, thereby forming a series of rigid posts which together produce a reeling hub about which a web may then be wound.

Other objects of the invention will be pointed out in the following description and claims and illustrated in the accompanying drawing, which disclose by way of example, the principle of the invention and the best mode which has been contemplated of applying this principle to reeling devices.

Figures 3, 4, 5:
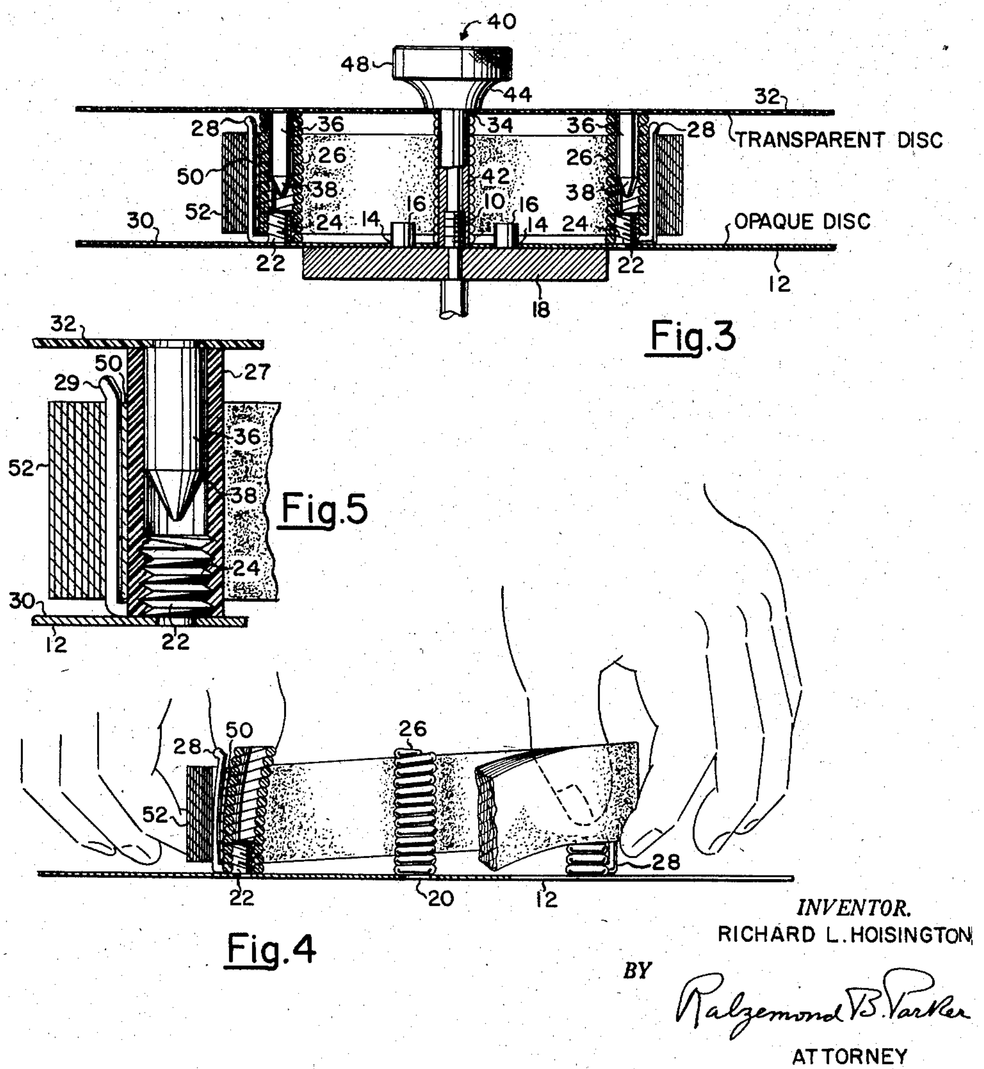
Fig. 3 is a side view partially in cross section of the tape reel in an assembled condition.

Fig. 4 is a side view partially in cross section illustrating the manner in which the tension releasing and reeling structure of the present invention is utilized to effectuate simple and easy removal of a coil of tape from the reel; and Fig. 5 is an enlarged fragmentary view of one end of the device illustrated in Fig. 3 and showing a different embodiment of the tape securing means of the invention.

Figure 1:
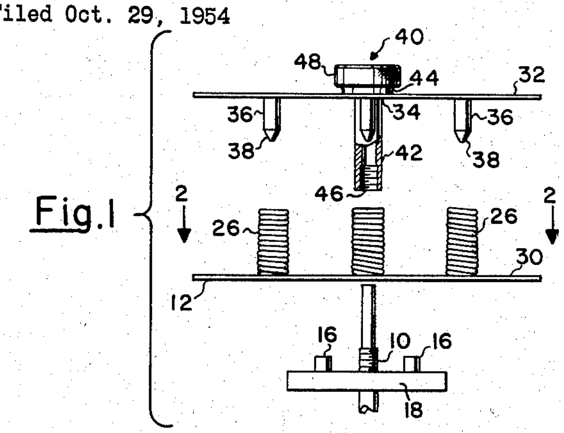
Fig. 1 is an exploded side view partially in section of a reeling apparatus embodying the present invention.

In the drawing and particularly in Figs. 1 and 3 thereof, the reeling apparatus of this invention is shown as being operatively connected to an external source of power including a drive shaft 10. In one application the invention may be applied to a business machine. However, the driving shaft 10 may derive power from any suitable driving source such, for example, as an electric motor.

Figure 2:
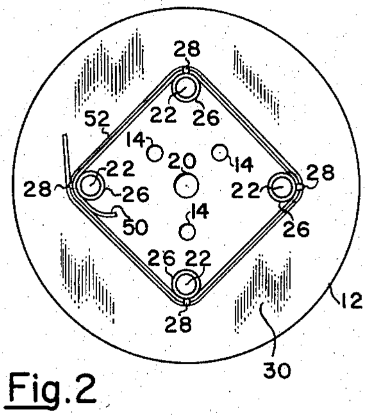
Fig. 2 is a top plan view in the direction of the arrows 2—2 of the lower disc of Fig. 1 showing the tape securing means used with the invention.

Briefly described, the novel tape reeling apparatus comprises a pair of coaxially related disc-like members. One disc 12, which is adapted to be driven from the shaft 10, is provided with multiple apertures 14, Fig. 2, for the reception therethrough of complementary pins 16, Figs. 2 and 3, which project from a fly wheel 18 operatively secured to the shaft 10. The pins 16 provide means for causing the disc 12 to rotate together with the shaft 10 as a unit. The disc 12 may be fabricated from any lightweight material such as aluminum. A central axial mounting hole 20 is provided in the disc 12 so that the disc may be received over the shaft 10. Projections in the form of aligning studs 22, Figs. 1, 2 and 3, are rigidly secured by any suitable means to one surface of the disc 12. Each of the studs 22 is or may be threaded as at 24, Fig. 3.

An individual, resilient and flexible separating member such as a coiled spring 26 is thus adapted to be threaded over each one of the studs 22. The lower end or terminal portion of each spring 26 is brought out straight and bent back to extend along the outside of the coil to provide an upstanding, longitudinally extending gripping member 28. Each one of the springs 26 is secured to its respective stud 22 by threading the spring down over the stud until the end of the spring abuts the uppermost surface 30 of the disc 12. Since the springs are closely wound they are relatively incompressible in an axial direction. This factor assures that the length of each spring remains relatively constant and in this manner there is produced an accurate predetermined spacing between the disc 12 and its associated disc 32, when assembled. Each spring 26 projects above its respective stud to provide a hollow core for the purpose of receiving a mating stud as will be more fully described hereinafter.

The second disc 32 provides a removable cover for the reel. It is preferably fabricated from some transparent material such as "Lucite." The transparent disc 32 permits visible inspection of the condition of the web supply as it is being wound onto the reel. The cover disc 32 also protects the web from dust and other foreign matter which may settle thereon during periods of inactivity. The surface of the disc 32 which is to be placed adjacent and parallel to the disc 12, is provided with an axial mounting aperture 34 and a plurality of rigidly secured projecting pins or studs 36 concentrically spaced about the disc axis. Each stud 36 is provided with a conically shaped end portion 38. As many studs 36 are provided on the cover disc 32 as there are coiled springs 26 on the disc 12 and the former are spatially arranged and dimensionally proportioned so as to register with the hollow centers of the coiled springs and telescope with the same as is evident in Figs. 3 and 5.

A detachable connection structure between the two discs 12 and 32 comprises a female connecting member 40 which has an elongated shank 42 projected from an enlarged shoulder portion 44. The shank end of the member 40 has a hollow threaded bore 46 while the shoulder portion end thereof has an enlarged knurled knob 48. The member 40 is received through the apertures 20 and 34 of the two discs 12 and 32 and is adapted to engage the threads of the shaft 10 so that the two discs may be held in fixed spatial position for rotation on the shaft 10 as a unitary assembly.

When the studs 36 are received within the coiled springs 26 the latter are stiffened by the former so as not to bend or deflect out of their normal axes. In this manner the coiled springs provide a mounting and grasping means for reeling the tape. Thus, when the two discs are properly assembled together as in Figs. 3 and 5, a relatively rigid spool or hub is provided upon which the tape can be wound but which when the two discs are separated is resistingly compressible toward the axis of the tape reel to permit ready removal of the tape.

To use the novel tape reeling apparatus, the disc 12 is first placed over the fly wheel 18 and the pins 16 are brought into registry with the holes 14 so that the disc may be removably connected to the drive means by means of the drive shaft 10. The leading edge 50 of a web of material such as a paper tape 52 is introduced between the longitudinally extending member 28 and the coil of one of the springs 26. The tape is thus yieldingly gripped and secured by the member 28.

The transparent cover disc 32 may then be placed over the disc 12 so that the studs 36 of the former are received within the springs 26 mounted on the latter. The threaded bore of the connecting member 40 is then received over the shaft 10 to engage the threads of the shaft so that the two discs are assembled in spaced apart relation as a unit. The shoulder 44 on the connecting member 40 provides a working surface which presses the studs 36 well down into the recesses within springs 26. The motor or other drive source may now be energized and the tape reel will be revolved through the shaft 10, thereby causing the tape 52 to be reeled up under substantially constant tension without fear of tape separation or breakage.

Referring now to Fig. 4, once the tape has been completely reeled and it is desired to remove the tape from the reeling means, the operation is extremely simple. The operator merely removes the connecting member 40, lifts off the cover disc 32, and grasps the opposite sides of the reel of tape between the thumb and fingers and lifts the reeled tape off the springs 26.

Since the stiffness supplied by the studs 36 of the cover disc has now been withdrawn, the springs 26 will tend to flex or bend slightly from their vertical axes in response to handling pressure of the operator. This deformation due to the resilience of the springs permits the operator to withdraw the tape readily and quickly. It is likewise a relatively simple and easy matter to reinsert the reel of tape onto the springs since the springs may be deflected toward the axis of the tape while the tape is simply lowered over the springs.

There is no requirement that the individual components of the device as herein described be made of any specific material or composition of matter so long as suitable tensile strength and proper resilience is provided in the various parts. And, in certain applications wherein the present invention is to be utilized it may be desirable or necessary to eliminate some or all of the metallic parts in the fabrication of the reel assembly.

One embodiment of the invention using more nonmetallic parts is set forth in Fig. 5 wherein the resilient member 27 corresponding to coiled spring 26 is fabricated from a resilient material such as plastic or rubber. A desirable plastic is "Neoprene" which is semi-rigid at room temperature. The resilient member 27 which is shown as a cylinder or a sleeve is adapted to be shrunk fit to the stud 22. A clip 29 having the same general shape and dimensions as the member 28 is secured to one end of the sleeve so as to project longitudinally of the longest sleeve dimension and to press tightly against the side wall of the sleeve. The clip 29 thus serves the same general purpose as the member 28. The sleeves retractably receive the studs 36 and are stiffened by the latter to form a relatively rigid hub upon which the web or tape is wound.

The reeling device herein described thus solves the problem of removal of the coiled tape from the reel without losing, breaking, or disarranging any of the coils. Also, by the simple expedient of providing multiple springs with their gripping members 28, the operator is offered multiple points of contact for insertion of the paper web so that regardless of the position in which the operator finds himself with relation to the machine, he can quickly and simply insert the tape from any one of the four different positions shown on the reel. It is also clear from the description of the apparatus that the reeling means is adaptable for various widths of tape. A change in width may be simply and quickly effected by the simple expedient of separating the discs 12 and 32 and the connector member 40 and exchanging them for others of a different length. The use of a transparent cover member 32 gives the operator a visible check on the reel supply so that he or she may be made instantaneously aware of the amount and immediate condition of the tape which has been coiled upon the reel. Also, various degrees of gripping pressure may be maintained by replacing one set of springs with another and stiffer set. The problem of interchanging wound or coiled webs between machines of different manufacturers has thus been solved in a completely novel manner since regardless of whether the reel assembly is to be utilized or not the web of material can be quickly and simply removed from the novel reel apparatus and just as simply placed on a different reel assembly.

What is claimed is:

1. A tape retaining reel comprising a pair of disc-like members, means for detachably coupling said disc-like members and maintaining them together in spaced apart parallel relation about a common axis, substantially non-resilient stud elements projecting inwardly from one of said members, and sleeve-like elements projecting inwardly from the other of said members, said stud elements and sleeve-like elements interfitting with one another to form a tape-supporting hub for the winding of tape thereon and the unwinding of tape therefrom, and said sleeve-like elements being of finger-pressure flexibility to permit the elements to be flexed out of their normal axis when the members are uncoupled from one another whereby a roll of tape may be assembled on said sleeve-like elements and removed therefrom by application of finger pressure to deflect the elements.

2. The invention as set forth in claim 1 wherein at least one of said sleeve-like elements comprises a flexible coiled spring.

3. The invention as set forth in claim 1 wherein at least one of said sleeve-like elements is formed at least in part of resilient plastic material.

4. The invention as set forth in claim 1 which includes means disposed closely alongside of at least one of said sleeve-like elements and cooperating therewith for holding fast an end of tape prior to winding.

5. A tape reeling device comprising a pair of detachably and spacedly coupled disc-like members, flexible projections on the inner face of one of said members, stiffening elements extending from the inner face of the other of said members, said flexible projections being hollow and slidably receiving said stiffening elements and forming in cooperation therewith a relatively rigid base upon which tape may be wound, said flexible projections, in the absence of said stiffening elements, having a sufficient flexibility to permit bending thereof to facilitate assembly of a roll of tape thereon or the removal of a roll of tape therefrom.

6. Apparatus for winding and unwinding tape-like lengths comprising end members separably coupled in spaced apart substantially parallel relation for rotation about a common axis, said members each having inwardly directed extensions, the extensions of one said member being individually opposed to and interfitted with those of the other to form a plurality of circularly spaced bridging elements between the end members which cooperate together to constitute a winding hub, one extension of each of said bridging elements being flexible and stiffened by the presence of its corresponding interfitting extension, said relatively flexible extensions of said bridging elements in the absence of their corresponding interfitting extensions being manually deflectable out of their normal position to assist in the removal of wound tape-like lengths from the hub or return thereof thereto without substantial displacement of individual windings of said wound lengths.

7. A tape winding and unwinding reel comprising, in combination, a pair of similarly formed disc-like members detachably connected together at their centers and jointly rotatable about their common axis, one of said members carrying a plurality of flexible sleeve-like elements projecting from the inner face thereof toward the other member and circularly spaced apart from one another around the axis of rotation of the members, each of said elements presenting an open end toward the other member and being deflectible out of its normal projecting condition toward the axis of rotation, the other of said pair of members carrying a plurality of substantially rigid stud-like elements projecting from the inner face thereof toward the first member and retractingly telescopingly received in the sleeve-like elements, the presence of the stud-like elements in the sleeve-like elements stiffening the latter and causing the same to form a relatively rigid hub upon which a tape may be wound but when retracted by detachment of the members permitting the sleeve-like elements to be deflected in order to aid in the bodily removal of the wound tape from the hub.

References Cited in the file of this patent

UNITED STATES PATENTS

| | | |
|---|---|---|
| 1,267,773 | Kohn | May 28, 1918 |
| 1,823,245 | Wittel | Sept. 15, 1931 |
| 2,476,928 | Thomas | July 19, 1949 |
| 2,646,233 | Gazet | July 21, 1953 |